US008862821B2

(12) United States Patent
Mardiks

(10) Patent No.: US 8,862,821 B2
(45) Date of Patent: Oct. 14, 2014

(54) PORTABLE DEVICE FOR MANAGING MEMORY CARDS

(75) Inventor: Eitan Mardiks, Ra'anana (IL)

(73) Assignee: Sandisk IL Ltd., Kfar Saba (IL)

( * ) Notice: Subject to any disclaimer, the term of this patent is extended or adjusted under 35 U.S.C. 154(b) by 1074 days.

(21) Appl. No.: 12/169,361

(22) Filed: Jul. 8, 2008

(65) Prior Publication Data

US 2010/0011163 A1 Jan. 14, 2010

(51) Int. Cl.
*G06F 12/00* (2006.01)
*G11B 27/34* (2006.01)
*G11B 27/32* (2006.01)
*G11B 27/00* (2006.01)
*G11B 27/10* (2006.01)

(52) U.S. Cl.
CPC .............. *G11B 27/105* (2013.01); *G11B 27/34* (2013.01); *G11B 27/322* (2013.01); *G11B 2220/41* (2013.01); *G11B 27/002* (2013.01); *G11B 2220/17* (2013.01); *G11B 2220/61* (2013.01)
USPC ............ 711/115; 711/E12.001; 711/E12.084; 710/301

(58) Field of Classification Search
USPC ............ 711/115, E12.084, E12.001; 710/301
See application file for complete search history.

(56) References Cited

U.S. PATENT DOCUMENTS

| 6,594,154 | B1 | 7/2003 | Brewer et al. | |
|---|---|---|---|---|
| 6,644,556 | B2 | 11/2003 | Adelmann | |
| 6,948,016 | B2 * | 9/2005 | Cedar et al. | 710/104 |
| 7,281,246 | B1 * | 10/2007 | Rapakko et al. | 717/175 |
| 7,306,159 | B1 | 12/2007 | Rochelo | |
| 2002/0174286 | A1 | 11/2002 | Tamura | |
| 2003/0010829 | A1 | 1/2003 | Krygier | |
| 2004/0039876 | A1 * | 2/2004 | Nelson et al. | 711/115 |
| 2004/0068601 | A1 * | 4/2004 | Kang et al. | 710/301 |
| 2005/0108462 | A1 * | 5/2005 | Choi et al. | 711/5 |
| 2005/0150961 | A1 | 7/2005 | Porter | |
| 2005/0168591 | A1 | 8/2005 | Proidl | |
| 2006/0026350 | A1 * | 2/2006 | Lee et al. | 711/115 |
| 2007/0296832 | A1 | 12/2007 | Ota et al. | |
| 2008/0162797 | A1 | 7/2008 | Teicher et al. | |

FOREIGN PATENT DOCUMENTS

| CN | 101075283 A | 11/2007 |
|---|---|---|
| EP | 1376592 A2 | 1/2004 |
| GB | 2391352 A | 2/2004 |
| JP | 2000029998 A | 1/2000 |
| JP | 2000032582 A | 1/2000 |
| JP | 2002358485 A | 12/2002 |

OTHER PUBLICATIONS

International Search Report and Written Opinion for International Application No. PCT/IB2009/006165, dated Sep. 30, 2009, 12 pages.

(Continued)

*Primary Examiner* — Jasmine Song
(74) *Attorney, Agent, or Firm* — Toler Law Group, PC

(57) ABSTRACT

A portable device includes n (n≥2) electrical sockets, each of which is configured to accommodate and to electrically engage a removable external memory card; an input device for selecting accommodated and electrically engaged external memory cards for data reading; and an output device for outputting information that is derived from or related to data read from such selected electrically engaged external memory cards. The information may pertain to digital content of the selected external memory card, to the identity of the selected external memory card, or to the storage capacity of the selected external memory card.

19 Claims, 5 Drawing Sheets

(56) References Cited

OTHER PUBLICATIONS

Communication pursuant to Article 94(3) EPC issued on Jul. 12, 2011 in European Patent Application No. 09 785 985.4, 4 pages.
"CES 2007: A-DATA Info SD Card", http://gizmodo.com/gadgets/peripherals/ces-2007-adata-info-sd-card-213447.php, Nov. 8, 2006, 1 page.
Office Action dated Apr. 2, 2013 issued in Chinese Application No. 200980123738.4, with English translation, 14 pages.
Office Action dated Dec. 16, 2013 issued in Chinese Application No. 200980123738.4, with English translation, 12 pages.

* cited by examiner

# PORTABLE DEVICE FOR MANAGING MEMORY CARDS

FIELD OF THE INVENTION

The present invention generally relates to storage devices and more specifically to a portable device for managing memory cards.

BACKGROUND

Memory cards are increasingly becoming smaller. Smaller memory cards provide substantial convenience in storing, backing-up and transferring data such as computer programs, video and audio files, and the like. Small memory cards, however, give rise to risk related to transport of the memory cards, and to inconvenience in handling them. For example, a memory card can be lost; the form factor of the memory card may be too small to carry printed information; if a user has several memory cards the user would have to separately connect each of them to a personal computer ("PC"), which is inconvenient and hassling; electrical contacts of a memory card may be short-circuited, etc. Small memory cards may also be easily misplaced.

Various memory card holders that offer some protection to stored memory cards are currently available in the market. For example, a small box-like plastic holder that accommodates a single memory card may prevent the memory card from becoming bent or broken. However, because of its small size, the box-like plastic holder may also get lost in a purse or bag just as easily as the memory card.

In other solutions a plastic protective carrier is provided, which provides for a protective band to overlie data transfer ports of the memory card whenever the card is secured within the carrier. Other solutions involve providing a rigid exterior shell that houses resilient inserts within the shell to completely enclose a memory device and thereby protect it against damage from impact.

There is therefore a need to address these memory cards carrying solutions in a way that would make them useful. For example, there is a need for a portable device that is capable of both storing multiple memory cards and providing to the user of the memory cards displayable and/or audible information that pertains to the stored memory cards, and that allows a PC to manage multiple memory cards more conveniently.

SUMMARY

It would, therefore, be beneficial to allow a user to store multiple memory cards in a portable device in a way that the portable device can provide to the user of the memory cards displayable and/or audible information that pertains to the stored memory cards, and in a way that managing the memory cards by a PC would be more convenient. Various embodiments are designed to implement such capability, examples of which are provided herein. The following embodiments and aspects thereof are described and illustrated in conjunction with systems, tools, and methods, which are meant to be exemplary and illustrative but not limiting in scope.

To reach an internal or embedded memory device the housing or enclosure of the host containing it would have to be opened or disassembled. For example, computer systems such as personal computers ("PCs") use memory cards (e.g., ROM, RAM, and EEPROM) plugged into their motherboard, which makes these cards "internal" and "non-portable". Usually a technician would remove or replace such a memory cards when they malfunction but not for sharing content between hosts.

Accordingly, the various embodiments described herein pertain to removable, external memory cards that can be detachably electrically engaged with a host from the outside without opening the enclosure or housing of the host. For example, various embodiments use removable, external memory cards configured to be plugged into a socket of the host (e.g., a digital camera) without the need to open the enclosure or housing of the host. An external, removable memory card can be easily transferred by an end-user from one host to another without requiring technical skills or assistance.

According to the present disclosure a portable device for managing a plurality of memory cards includes n (where n≥2) electrical sockets, each of which is configured to accommodate and to electrically engage a removable external memory card; an input device to select accommodated and electrically engaged external memory cards in order to read data therefrom; an output device, which may include a display and/or a speaker, to present information to a user of the portable device that is derived from, or related to, the read data and pertains to selected electrically engaged external memory cards; and a controller that is adapted or configured to receive a memory card selection signal from the input device and, responsive to receiving the memory card selection, the controller is further adapted to read data that is stored in the selected external memory card and to transfer, or convey, to the output device information that is derived from, or related to, data read from such selected electrically engaged external memory card.

The portable device has a rim on top of which, or in which, the n electrical sockets may be dispersed, embedded, or otherwise located. The n electrical sockets may be designed to engage external memory cards that have the same or different form factors.

The input device may be a user input device that allows a user of the portable device to select a removable external memory card for data reading. The input device may include n memory card detectors, where each of the n memory card detectors is incorporated into or embedded in, or otherwise associated with, a respective electrical socket. The n memory card detectors may facilitate automatic detection of electrically engaged memory cards.

The user input device may include n user inputs, wherein each of the n user inputs is associated with a respective one of the n electrical sockets. In one embodiment the user input device is an n-state rotatable selector (e.g., a rotatable selection wheel). According to another embodiment the user input device is an n-state slidable selector, where each of the n states of the n-state selector is associated with a respective one of the n electrical sockets.

In another embodiment the user input device is an n+1 state rotatable selector where each state of n states of the n-state selector is associated with a respective one of the n electrical sockets and switches the portable device on, and where the n+1 state of the n+1 state selector switches the portable device off. In another embodiment the memory card selector is an n+1 state slidable selector, where the n+1 state shuts down (i.e., switches off) the portable device. "Switching off the portable device" may mean total shut-down of the portable device, or the portable device entering a "sleep" mode or a power-save mode.

The user input device may be implemented as one depressible push button that is adapted, configured or designed to cause electrically engaged external memory cards to be selected in a cyclic manner with each depression of the push button, or, in other words, to cause selection in sequence of a next electrically engaged external memory card.

The output device of the portable device may be a display or a speaker that is adapted, configured or designed to receive from the portable device's controller the information, or a modified version thereof.

The portable device may include a communication interface that is adapted, configured or designed to transfer data between the portable device and an external device, wherein the data is read from or written into a memory card electrically engaged with one of the n electrical sockets. The communication interface may be, for example, a Universal Serial Bus ("USB") interface or a wireless interface. The external device may be a personal computer or a mobile device. The controller may be adapted, configured or designed to transfer data to and from the external device per request of the external device.

The information read from an external engaged memory card may pertain to the digital content of that memory card, or to the identity of that memory card, or to the storage capacity of that memory card.

The n electrical sockets, which may be embedded in slots, are adapted to accommodate, and to electrically engage, at least one of MultiMedia Card ("MMC)"), a Secure Digital ("SD") memory card, a microSD card, a Memory Stick ("MS"), a Memory Stick Micro, and a CompactFlash card.

In another embodiment a method for managing external removable memory cards by a portable device may include providing a portable device, the portable device including (i) n electrical sockets (n≥2), each of which is configured, adapted or designed to accommodate and to electrically engage a removable external memory card, (ii) an input device (e.g., a user input device), for selecting an external memory card for data reading, (iii) an output device for presenting information pertaining to selected external memory cards; selecting an accommodated and electrically engaged removable external memory cards in order to read data therefrom, by using the input device; and responsive to selecting the external memory card, (i) reading data stored in the selected external memory card, and (ii) transferring to the output device information, the transferred information being derived from, or related to, data read from the selected electrically engaged external memory card. The information transferred to the output device may pertain to digital content of the selected external memory card, and/or to the identity of the selected external memory card, and/or to the storage capacity of the selected external memory card.

Selecting the external memory card for data reading may be effected by using a memory card detector that is incorporated into, or embedded in, or otherwise associated with, an electrical socket accommodating and electrically engaging the selected external memory card. Selection of the electrically engaged external memory card for data reading by the memory card detector may be effected automatically, for example, upon insertion of the external memory card to its electrical socket.

Selecting the external memory card for data reading may be effected by a user input means that is associated with the electrical socket accommodating and electrically engaging the selected external memory card.

Selecting the external memory card for data reading may be effected by an n-state selector selected from one of an n-state rotatable selector or an n-state slidable selector, wherein each state of the n states of the n-state selector is associated with a respective one of the n electrical sockets.

Selecting the external memory card for data reading may be effected by an n+1 state selector selected from any of n+1-state rotatable selector and n+1-state slidable selector, wherein each state of n states of the n+1 state selector is associated with a respective one of the n electrical sockets and switches the portable device on, and wherein the n+1 state of the n+1-state selector switches the portable device off.

Selecting the external memory card for data reading may be effected by a depressible push button that is adapted, configured, or designed to cause, with each depression thereof, electrically engaged external memory cards to be selected for data reading in a cyclic manner.

The method may further include transferring data between the portable device and an external device, wherein the data is read from or written into an external memory card electrically engaged with one of the n electrical sockets via a communication interface of the portable device. Transfer of the data to and from the external device may be per request of the external device.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

Figure 1:
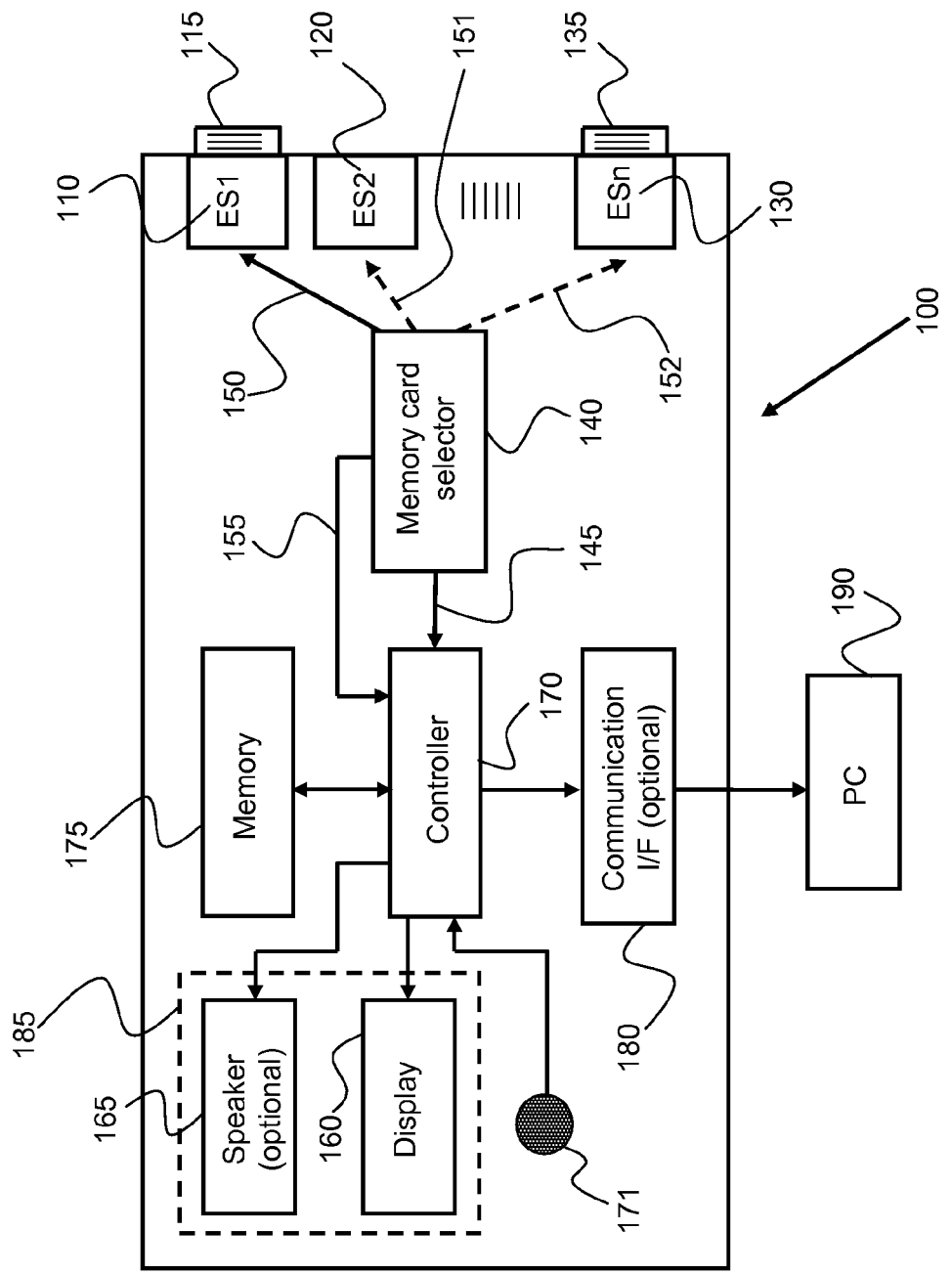
FIG. 1 is a block diagram of a portable device for managing memory cards according to an example embodiment.

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The description that follows provides various details of example embodiments. However, this description is not intended to limit the scope of the claims but instead to explain various principles of the invention and the manner of practicing it.

According to the present disclosure a portable device is provided for managing memory cards, where managing may include holding/carrying and administrating memory cards, as described below in connection with FIGS. 1 through 5.

FIG. 1 shows a block diagram of a portable device 100 for managing removable external memory cards (hereinafter referred to as "memory cards" for short) according to an example embodiment of the present disclosure. Portable device 100 includes a body (not shown in FIG. 1) that includes n (n≥2) electrical sockets ("ESs"), designated as ES1 (shown at 110), ES2 (shown at 120), ..., and ESn (shown at 130), for accommodating, and electrically engaging, up to n removable external memory cards. Different electrical sockets of the n electrical sockets may have different sizes or designs to accommodate different types of memory cards. For example, electrical socket 110 may be designed to accommodate, and to electrically engage, (i.e., memory card 115 may be) a removable flash memory card known in the field as microSD card. MicroSD is used mainly in mobile telephones, but also in handheld GPS devices, portable audio players, video game consoles, expandable USB flash memory drives, and so on. Currently, microSD is the smallest removable memory card available commercially. At 15 mm×11 mm×0.7 mm, it is about a quarter the size of a Secured Digital ("SD") card. There are adapters which allow a microSD card to be used in devices intended for SD, miniSD, or Memory Stick Duo cards; however they are not universally compatible.

By way of example, electrical socket 120 may be designed to accommodate, and to electrically engage, a removable flash memory card known as MMC. Because MMC and SD cards have the same dimensions, an electrical socket (e.g., electrical socket 120) designed to accommodate, and to electrically engage, a memory card of one type (e.g., the MMC card) can accommodate, and electrically engage, a memory card of the other type (e.g., the SD card).

By way of example, electrical sockets 110 and 130 are shown respectively accommodating, and electrically engaging, memory cards 115 and 135. In order for a memory card such as memory card 115 to be accommodated by, and to electrically engage, an electrical socket such as electrical socket 110, an operator, or user, of portable device 100 has to insert the memory card into a free electrical socket. By "a memory card is accommodated by an electrical socket" is meant that the memory card resides in the electrical socket, at least partly, and that the operator or user of portable device 100 can remove the memory card from the electrical socket. By "a memory card electrically engage an electrical socket" is meant that, when the memory card is accommodated by an electrical socket, electrical contacts on the memory card touch corresponding electrical contacts on the electrical socket, through which electrical power can be provided to the memory card and the memory card and the portable device 100 can communicate.

Figure 2:
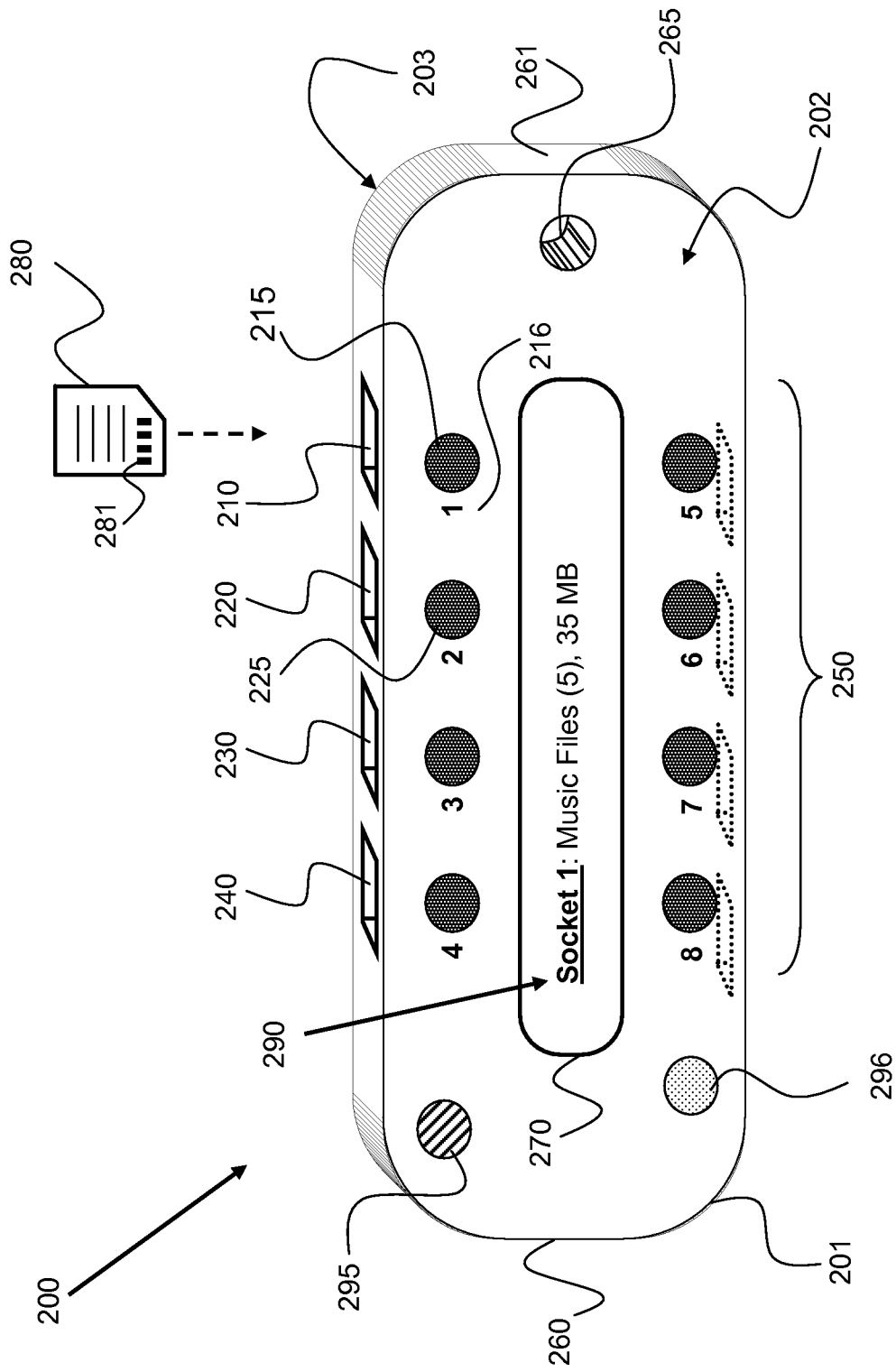
FIG. 2 schematically illustrates a portable device for managing memory cards according to an example embodiment.
Figure 3:
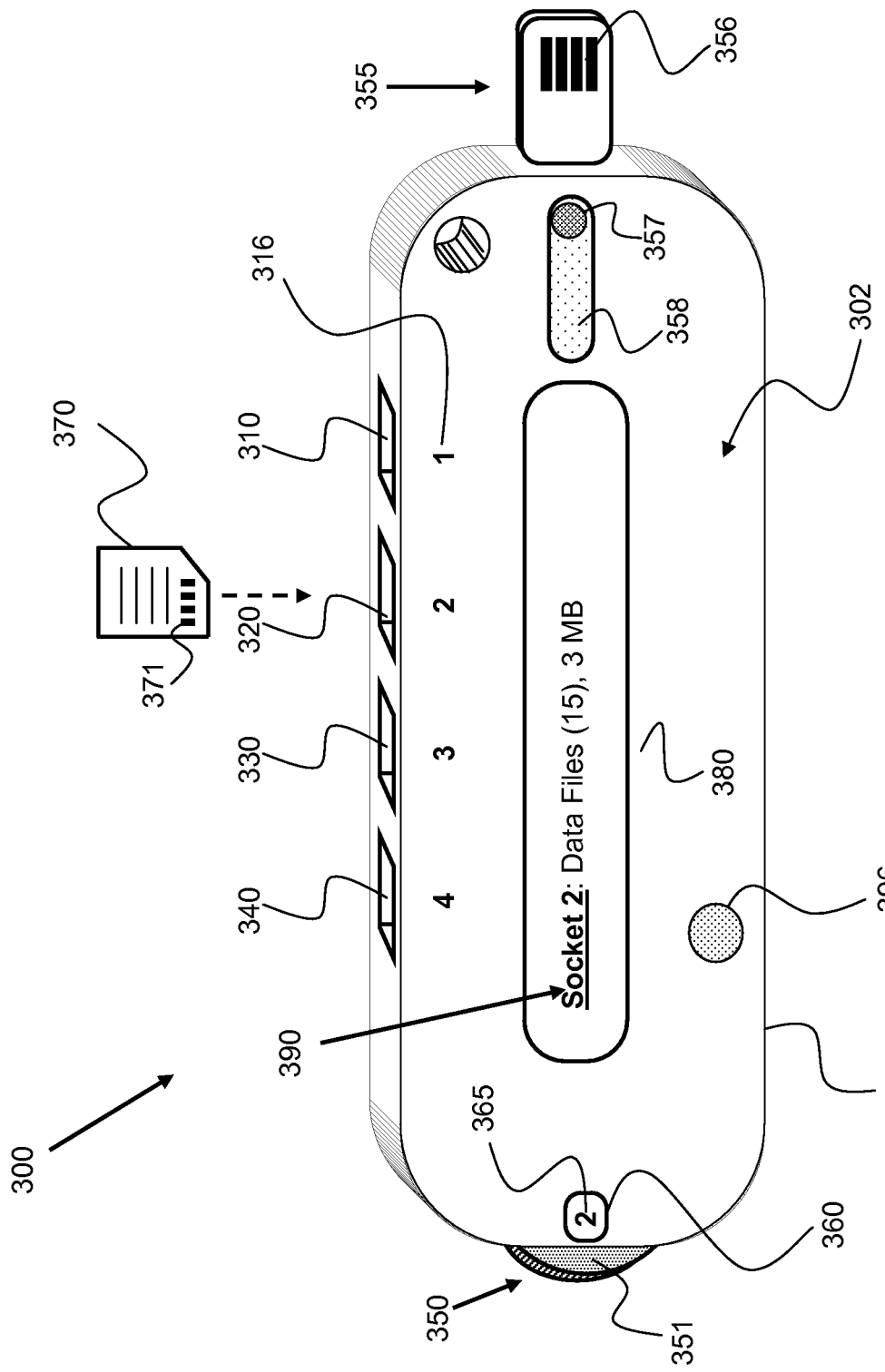
FIG. 3 schematically illustrates a portable device for managing memory cards according to another example embodiment.

Portable device 100 also includes a user input device 140 that is adapted, configured, or designed, to select an electrically engaged memory card in order to read data therefrom. User input device 140 functions as a user-operable memory card selector, for which reason it is referred to hereinafter as "memory card selector". In other words, memory card selector 140, serving as a user input device, allows an operator or user of portable device 100 to select a memory card for data reading among one or more electrically engaged memory cards. Memory card selector 140 may be implemented in various ways. For example, memory card selector 140 may be implemented as n flat touch-sensitive switches, as shown in FIG. 2, or an n-state, or multiple position, selection rotatable wheel, as shown in FIG. 3.

By way of example, memory card selector 140 is shown selecting memory card 115 for data reading, the selection being shown as solid arrow 150, as opposed to dashed lines 151 and 152 that are pointed at non-selected, or deselected, memory cards or electrical sockets. It is noted that selecting, by the operator or user, an electrical socket that accommodates a memory card of interest is the same as selecting the memory card itself. By "selecting a memory card" is meant herein selecting a memory card in order for information relating to data stored therein to be presented to the user or operator of portable device 100, whether visually or audibly, or both visually and audibly.

Portable device 100 also includes an output device 185 for presenting information pertaining to a memory card selected from one or more engaged memory cards, or to data read from the memory card, or to both. Output device 185 includes a display 160 for displaying any of the information, the data read from the memory card, and information or data related to, or associated with, the memory card (e.g., the memory card's type) or with the data read from the memory card, or both. Output device 185 may additionally or alternatively include a speaker such as speaker 165 for playing back an audio file that is stored in an electrically engaged memory card, or information related to such a file or to the memory card.

Portable device 100 also includes a controller 170 that is adapted or configured to receive a memory card selection (i.e., a memory selection signal) from memory card selector 140. Responsive to receiving memory card selection signal (e.g., selection signal 155) from memory card selector 140, controller 170 is further adapted or configured to read data that is stored in the selected memory card, and to transfer to output device 185 information that is derived from, or related to, data that is read from the selected engaged memory card. The transferred information, which pertains to the selected memory card, may be output to output device 185 in order for it to be presented to the portable device's user or operator, for example on display 160 or through speaker 165, or by using both display 160 and speaker 165. The memory card selection signal forwarded from memory card selector 140 is symbolically shown in FIG. 1 as a solid arrow 155. Controller 170 may send to speaker 165 an audible version of the information sent to display device 160. That is, controller 170 may send to speaker 165 an audio signal corresponding to the information, or to a modified version thereof, or to an audio file that is stored in the selected memory card Referring to the example embodiment shown in FIG. 1, the operator or user of portable device 100 may be interested in displaying information that pertains to memory card 115 or to data stored therein. In order to display that information, the operator or user of portable device 100 has to operate memory card selector 140 to cause it to forward to controller 170 memory selection signal 155 that pertains to the selected memory card (i.e., to memory card 115). Accordingly, memory card selector 140 is shown pointing at memory card 115. Information pertaining to a selected memory card may include, or be based on or derive from data that is stored in the memory card and refer, for example, to one of the memory card's identification (ID) details, digital content stored in the memory card, and the memory card storage capacity. Information associated with a selected memory card may be derived from, or refer to, other or additional attributes or characteristics of the memory card or of data that is stored in the memory card. The type of a memory card and the version of the memory card's firmware are exemplary characteristics of memory cards.

Responsive to receiving memory card selection signal 155 from memory card selector 140, controller 170 reads data and/or information (shown at 145) from memory card 115 and, based on that data and/or information, controller 170 sends to output device 185 (e.g., to display device 160) information that pertains to memory card 115. For example, controller 170 may display on display 160 the "Volume ID" of the memory card, the first P (where P=1, 2, 3, . . . ) characters from storage block number i (where i=1, 2, 3, . . . ), or the content of a file having a certain, or pre-specified, file name. The data or information transferred to output device 185 may be predetermined or default data or information, or a dedicated file in each memory card may include the data or information to be presented to the user, or an instruct for controller 170 regarding the information that should be presented to the user.

The operator or user of portable device 100 may likewise operate or use memory card selector 140 to select another memory card (e.g., memory card 135) for data reading. If an unoccupied electrical socket (i.e., electrical socket 120) is accidentally selected, controller 170 may display on display device 160 an error message (e.g., "Error! No Memory Card In Socket No. 2").

Controller 170 may occasionally or intermittently commence a scan cycle to detect which electrical socket of electrical sockets 110 through 130 accommodates a memory card. Controller 170 may then store in non-volatile memory ("NVM") 175 the number or name (e.g., "ES1", shown at 110) of every electrical socket that accommodates a memory card and, in addition, information that pertains to the accommodated memory card. Alternatively, the scan cycle may be commenced manually, by the operator or user operating memory card selector 140 and causing controller 170 to store the above-described information (i.e., electrical sockets' numbers and related information).

Portable device 100 may include a communication interface 180 to facilitate transferring data and/or information pertaining to one or more memory cards to an external device 190 which, n the example shown in FIG. 1, is a personal computer ("PC"). Controller 170 may transfer information to PC 190, regarding any accommodated memory card, per request of PC 190. Communication interface may be a Universal Serial Bus ("USB") interface. Communication interface may be wireless.

Memory card selector 140 may include, or it may have associated with it, n memory card detectors, where each memory card detector is incorporated into, or embedded in, a respective electrical socket. Controller 170 may be "aware", or it may "sense" the presence, of an engaged memory card by receiving, via memory card selector 140, a signal from a memory card detector that is associated with the engaged memory card, or by scanning or probing the electrical socket, for example by using a "ping" mechanism. Briefly, "ping" is a computer network tool used to test whether a particular device is available. This tool involves sending messages to the target device and listening for replies. If there is no response for a specified time period (e.g., a few milliseconds), it is assumed that there is no target device connected, or the target device malfunctions. Using n memory card detectors by memory card selector 140 facilitates automatic detection of electrically engaged memory cards.

If a memory card is selected for data reading, controller 170 may cause display device 160 to display the information and, optionally or alternatively, cause speaker 165 to sound a message related to that memory card, after which controller 170 will enter a power-save mode by shutting down, or muting, selected electrical components of portable device 100 (e.g., display device 160). Alternatively, portable device 100 may have a user-depressible push button such as push button 171 that, if depressed by a user for at least a predefined duration (e.g. for at least 3 seconds), will forward a signal to controller 170, causing controller 170 to enter portable device 100 the power-save mode.

FIG. 2 schematically illustrates a portable device 200 according to an example embodiment of the present disclosure. Portable device 200 has a body 201 with a first end 260 and a second end 261 opposite first end 260. Body 201 also has first and second opposing outer surfaces, respectively shown at 202 and 203, that extend between first end 260 and second end 261.

In general, n electrical sockets may reside within body 201 between first outer surface 202 and second outer surface 203, each of the n electrical sockets may be adapted to accommodate, and electrically engage, a removable external memory card. By way of example body 201 of portable device 200 includes eight (i.e., n=8) electrical sockets, four of which are visible (i.e., electrical sockets 210, 220, 230, and 340) and the other four electrical sockets are hidden (generally shown at 250). The n (in this example n=8) electrical sockets may, wholly or partly, be circumferentially (for example) spaced apart. That is, body 201 may have a rim on top of which, or within which, the n electrical sockets may be dispersed or located.

Although shown having identical dimensions, electrical sockets of a portable device may differ in dimensions and in electrical contact layout to accommodate, and electrically engage, memory cards that have different form factors or different designs. Although shown parallel and flat, an outer surface may slant relative to the other outer surface, or an outer surface may be curved.

As explained above in connection with FIG. 1, a portable device has a memory card selector (shown at 140 in FIG. 1). In the example embodiment shown in FIG. 2 the memory card selector includes eight user input means, which are numbered "1" through "8". For example, electrical socket 210 is assigned number "1" (shown at 216). The identification ("ID") numbers "1" through "8" are also respectively assigned to the electrical sockets in order to ease identification thereof by the portable device's operator or user.

Each of the eight user input means 1 through 8 is associated with an electrical socket. For example, the user input means numbered 1 (shown at 215) is associated with electrical socket 210, user input means 225 is associated with electrical socket 220, and so on.

Portable device 200 includes a display device with display screen 270 to display information that pertains to memory cards that are accommodated by electrical sockets 210, 220, 230, 240, and 250. Memory card 280 is shown disengaged from any electrical socket but, if desired; the operator or user of portable device 200 can store it in any available electrical socket (e.g., electrical socket 210) that is physically and electrically suitable for storing memory card 280. If memory card 280 resides within electrical socket 210, or within any other design-wise suitable electrical socket, the operator or user of portable device 200 can cause display device 270 to display information associated with memory card 280. Assuming that the operator or user inserted memory card 280 into electrical socket 210, in order to display information pertaining to memory card 280 the operator or user has to operate user input means 215 (i.e., the user input means associated with memory card 280), as described in detail below. If memory card 280 is engaged with an electrical socket, electrical contacts 281 of memory card 280 engage electrical contacts in the electrical socket accommodating the memory card to form therewith a communication path via which portable device 200 and the external device can communicate. Memory card 280 may be, for example, a microSD, an MMC or a SD flash memory card.

User input means 215 may be a flat touch-sensitive switch or a flat depressible switch, and the operator or user of portable device 200 may effect the selection of memory card 280 by depressing user input means 215 or touching it, depending on the type of user input means 215. Briefly, a touch-sensitive switch is a switch that is activated by light touch or near proximity. Some touch-sensitive switches project a sensing field through air or any insulators and their sensing sensitivity can be tailored per customer requirements. This type of switches is designed to be mounted behind non-conductive panels like glass and plastic. Other types of flat touch-sensitive switches include a membrane. Flat touch-sensitive switches can be incorporated into first outer surface 202 of body 201.

Responsive to the operator or user of portable device 200 operating (i.e., by touching or by depressing) user input means 215, user input means 215 forwards to a controller (not shown in FIG. 2) of portable device 200 a memory card selection signal, to let the controller "know" that the portable device's operator is interested in information that pertains to memory card 280 to data that is stored in memory card 280. Responsive to receiving the memory card selection signal from user input means 215 the controller of portable device 200 transfers to display device 270 the requested information. In the example shown in FIG. 2, operating user input means 215 while memory card 280 resides in electrical socket 210 results in displaying the text "Socket 1: Music Files (5), 35 MB" (shown at 290) by display device 270.

Portable device 200 includes a speaker 295 to which the controller of portable device 200 can transfer an audio signal corresponding to the information displayed by display device 270, or to an audio file that is stored in the memory card. Portable device 200 also includes an electrical power source 296 to power the various components of portable device 200. Electrical power source 296 may be a watch battery, button cell, or coin cell, which is a small form factor battery designed for use, for example, in wrist watches, pocket calculators, and hearing aids. Electrical power source 296 may be a rechargeable battery. Rechargeable battery 296 may be recharged via a special electrical connector (not shown in FIG. 2) or via a communication interface, which is shown in FIG. 3 (i.e., communication interface 355 which may be a USB port). One of user input means (e.g., user input means 215) can also be used as an "On/Off" switch, to switch portable device 200 on and off. Alternatively, a dedicated switch (e.g., switch 297) may be use to switch portable device 200 on and off.

A hole 265 extends completely through solid body 201 of portable device 200, through which a key ring, or other attachment device, may extend. This makes it very convenient for the user to carry the portable device 200 on her or his key ring, along with various keys. The controller of portable device 200 may be identical or similar to controller 170 of FIG. 1.

Although shown parallel and flat, an outer surface of body 201 may slant relative to its other outer surface. An outer surface of body 201 may be curved. Although portable device 200 of FIG. 2 has an elongated rectangularly-shaped body, the body of a portable device may have a different shape. For example, a portable device may have an elongated ovally-shaped body.

FIG. 3 schematically illustrates a portable device 300 according to an example embodiment of the present disclosure. Portable device 300 has a body 301. Body 301 has first and second opposing outer surfaces, where only one of the two outer surfaces is referenced (i.e., outer surface 302).

In general, n electrical sockets may reside within body 301 between the first and second opposing outer surfaces of body 301. Each of the n electrical sockets may be adapted to accommodate and to electrically engage a removable external memory card. By way of example body 301 of portable device 300 includes four (i.e., n=4) electrical sockets (i.e., sockets 310, 320, 330, and 340). Although shown having identical dimensions, electrical sockets of a portable device may differ in dimensions and in electrical contact layout to accommodate, and electrically engage, memory cards that have different form factors, shapes, or designs. That is, a certain electrical socket may be designed for a specific type of memory card. The four electrical sockets 310, 320, 330 and 340 are assigned ID numbers "1" through "4". For example, electrical socket 310 is assigned number "1" (shown at 316). The identification ("ID") numbers "1" through "4" facilitate identification of the electrical sockets 310 through 340 by the portable device's operator or user.

As explained above in connection with FIG. 1, a portable device has a memory card selector. The memory card selector may be implemented as an n-state memory card selector, where each of the n states of the memory card selector uniquely corresponds to one of the n sockets of the portable device. In the example embodiment shown in FIG. 3 the n-state memory card selector is implemented as an n-state rotatable selection wheel 350. In this example the n-state rotatable selector has four states (i.e., n=4) because, in this example, there are four sockets 310, 320, 330, and 340. Alternatively, the n-state selector may be implemented as an n-state slidable selector (not shown in FIG. 3) that enables selection of a socket by sliding a slidable member of the selector to one of n lengthwise positions, thus selecting a state, or positions, that corresponds to the desired socket.

Each of the n states of n-state rotatable selection wheel 350, which is assigned a unique selection number, is associated with a different electrical socket. The selection numbers of n-state rotatable selection wheel 350 may be imprinted on the upper surface 351 of selection wheel 350 to facilitate selection of a memory card by the user of portable device 300. Outer surface 302 of body 301 may have a viewing opening 360 through which the n selection numbers can be viewed. Referring to FIG. 3, the selection numbers "1" through "4" imprinted on rotatable selection wheel 350 (of which only the selection number "2" is shown, at 365, through viewing opening or window 360) are respectively associated with the ID numbers "1" through "4" assigned to electrical sockets 310 through 340. View opening 360 may include a protective cap made of a transparent material, such as plastic.

If memory card 370 is engaged with an electrical socket, electrical contacts 371 of memory card 370 engage electrical contacts in the electrical socket accommodating the memory card, to form therewith a communication path via which portable device 300 and the external device can communicate. Memory card 370, which may be, for example, a MMC, a SD card, a microSD card, or a CompactFlash card, is shown detached from any electrical socket, but the operator or user of portable device 300 can insert memory card 370 into electrical socket 320 (for example) for storing it in portable device 300. Portable device 300 also includes a display device with display screen 380 to display information that pertains to memory cards that are accommodated by electrical sockets 310, 320, 330 and 340. While residing within electrical socket 320, or within any other design-wise suitable electrical socket of portable device 300, the user of portable device 300 can cause display screen 380 to display information pertaining to memory card 370.

Assuming that the user inserted memory card 370 into electrical socket 320, the user can effect selection of memory card 370 (in order to display information pertaining to that memory card) by rotating 4-state selection wheel 350 until the selection number associated with, or related to, electrical socket 320 (i.e., selection number "2") becomes viewable through viewing opening 360, as shown in FIG. 3.

Responsive to the operator or user of portable device 300 rotating 4-state selection rotatable wheel 350 to the desired state shown in FIG. 3, 4-state rotatable selection wheel 350 forwards to a controller (not shown in FIG. 3) of portable device 300 a memory card selection signal, to let the controller "know" that the portable device's operator or user is interested in information that pertains to memory card 370. Responsive to receiving the memory card selection signal from 4-state rotatable selection wheel 350 the controller of portable device 300 transfers to display screen 380 the requested information. In the example shown in FIG. 3, bringing selection wheel 350 to the position shown in FIG. 3 (while memory card 370 resides in the electrical socket numbered "2", shown at 320) results in displaying the text "Socket 2: Data Files (15), 3 MB" (shown at 390) on display screen 380.

Portable device 300 may include a communication interface, such as communication interface 355, to facilitate transferring of information to an external device via electrical contacts 356 of communication interface 355. Communication interface 355 may be, for example, a USB interface. Communication interface 355 may be provided with a protective case or cap, or it may be retractable. Alternatively, a cable may be attached or tied to communication interface 355 to enable communication interface 355 to be extended by pulling the cable. Regarding the "retraction" alternative, communication interface 355 may be designed to be in a retracted position when it is not in use and in an extended position, in which position communication interface 355 is manually pluggable into an external device, for example into a laptop computer. Communication interface 355 is shown in the extended position. Communication interface 355 fully resides in body 301 of portable device 300 in the retracted position. A depressible lock/unlock button, such as lock/unlock button 357, may be used by the user of portable device 300 to extend communication interface 355 and to lock it in the extended position, and to retract communication interface 355 (if it is currently extended) and to lock it in the retracted position. Alternatively, communication interface 355 may be extended and retracted by using a sliding mechanism that includes a sliding member, such as lock/unlock button 357, and a sliding path, such as sliding path 358. Communication interface 355 is shown in an extended position, and it can be retracted by sliding lock/unlock button 357 (which is mechanically coupled to communication interface 355, to the "retracted" position (i.e., the position opposite the "extended" position). That is, retracting communication interface 355 is effected by fully sliding lock/unlock button 357 rightward.

Portable device 300 also includes an electrical power source 396 to power the various components of portable device 300. Electrical power source 396 may be a watch battery, button cell, or coin cell, which is a small form factor battery designed for use, for example, in wrist watches, pocket calculators, and hearing aids. Electrical power source 396 may be a rechargeable battery. Rechargeable battery 396 may be recharged via one of the electrical sockets 310, 320, 330 and 340, or via communication interface 355.

Rotatable selection wheel 350 may also be used as an "On/Off" switch, to switch portable device 300 on and off. In order to impart that feature to rotatable selection wheel 350, rotatable selection wheel 350 is provided with an additional state (called position "O", state "n+1" or "on/off state") in which portable device 300 is switched "off", whereas portable device 300 is switched "on" in any other state that corresponds to a selected electrical socket or engaged memory card. In other words, selecting an electrical socket or memory card also switches on portable device 300. A rotatable selection wheel that enables selection of a socket/memory card and switching the portable device on and off may be thought of as having n+1 states, or it may be referred to as an "n+1 state selector". Alternatively, a dedicated separate switch (not shown in FIG. 3) may be used to switch portable device 200 on and off, or portable device 200 may be switched off automatically, after a predetermined period of time elapses from the last operation of portable device 200. As explained above, the n-state memory card selector may be implemented as an n-state slidable selector. The n-state slidable selector may likewise be provided with an additional state; i.e., with an "on/off state". Portable device 300 may have a hole similar to hole 265 in FIG. 2, to facilitate carrying it with a key ring.

Figure 4:
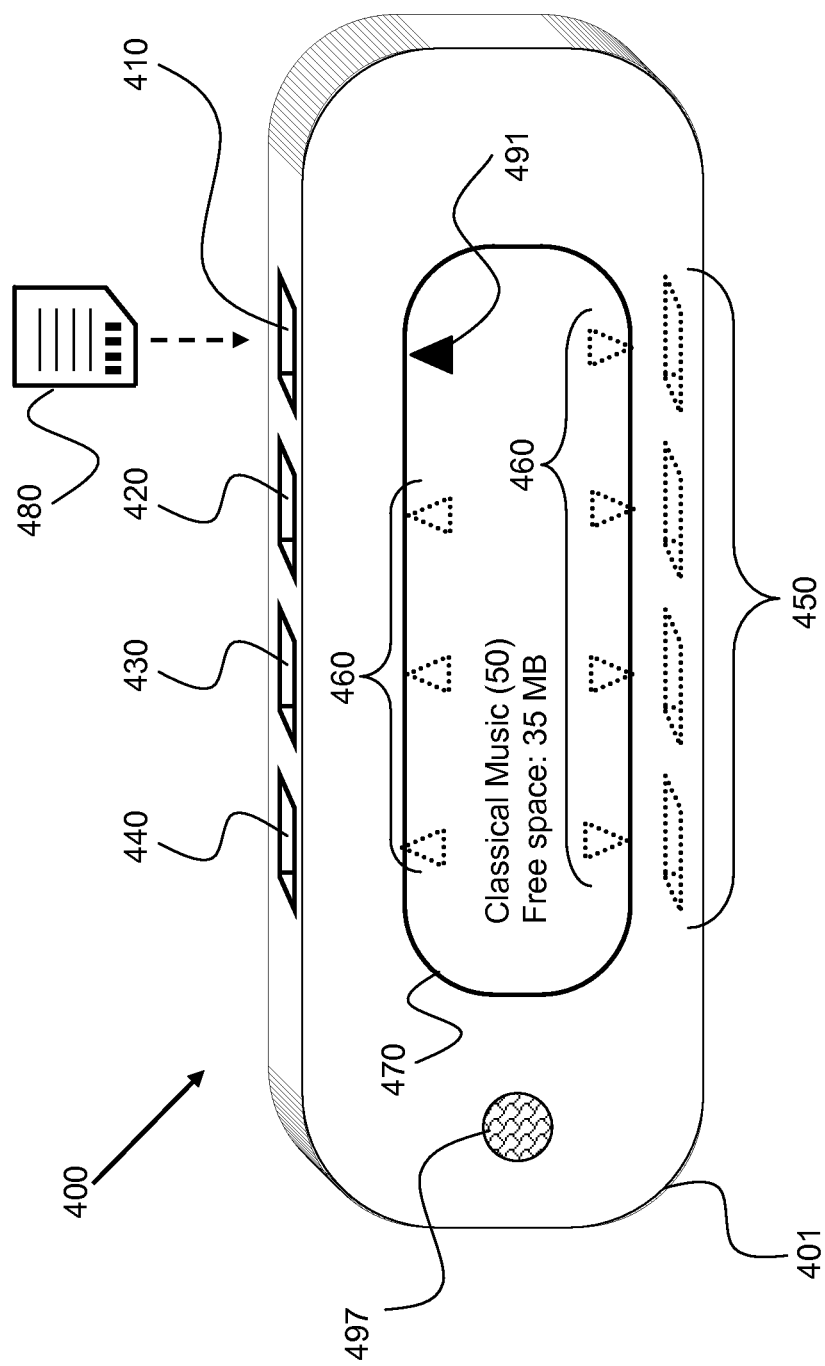
FIG. 4 schematically illustrates a portable device for managing memory cards according to yet another example embodiment.

FIG. 4 schematically illustrates a portable device 400 according to yet another example embodiment. In the example embodiment shown in FIG. 4 the memory card selector is implemented as a user-depressible push button 497 and a set of indicia, indicators or pointers 460 and 491 that are displayable on display screen 470.

Each of indicia, indicators or pointers 460 and 491 is uniquely functionally related to, or associated with, one of the exemplary eight (i.e., n=8) electrical sockets 410, 420, 430, 440 and 450 (only four of which are visible in FIG. 4: electrical sockets: 410, 420, 430 and 440). In order to make it easy for a user to see which electrical socket is currently selected, each displayable indicator is located near, or it points at, the electrical socket with which the indicator is associated. For example, displayable indicator 491 is located near, and it points at, electrical socket 410. By way of example indicia, indicators or pointers 460 are displayed as dotted triangles to visually indicate unselected or deselected electrical sockets, in which case each of these indicators or pointers may be thought of, or referred to, as being "inactive". By way of example indicator or pointer 491 is displayed as a solid triangle to visually indicate a selected electrical socket (i.e., electrical socket 410), in which case this indicator or pointer may be thought of, or referred to, as being "active". In order to save battery power (the battery is not shown in FIG. 4), only one indicator/pointer may be used at a time; namely, the active pointer (i.e., the indicator/pointer associated with a currently selected electrical socket). "Selected electrical socket" also means selected memory card; provided that the selected electrical socket accommodates, and electrically engages, a memory card.

User-depressible push button 497 is adapted or configured to cause (i.e., with each depression thereof) electrically engaged memory cards to be selected for data reading (i.e., by a controller of portable device 400) in a cyclic manner. For example, if memory card 480 electrically engages electrical socket 410 and selected for data reading, indicator/pointer 491 indicates that the controller (not shown in FIG. 4) of portable device 400 is going to read, or is now reading, data from (the accommodated/inserted) memory card 480. A steady (i.e., non-blinking) solid indicator/pointer may indicate a selected electrical socket, and a blinking solid indicator/pointer may indicate that a data reading process (i.e., data reading from the memory card) is in progress. Depressing user-depressible push button 497 may cause only those indicators/pointers which are associated with occupied electrical sockets to be displayed on display screen 470. An "occupied electrical socket" is an electrical socket that accommodates and electrically engages a memory card.

Figure 5:
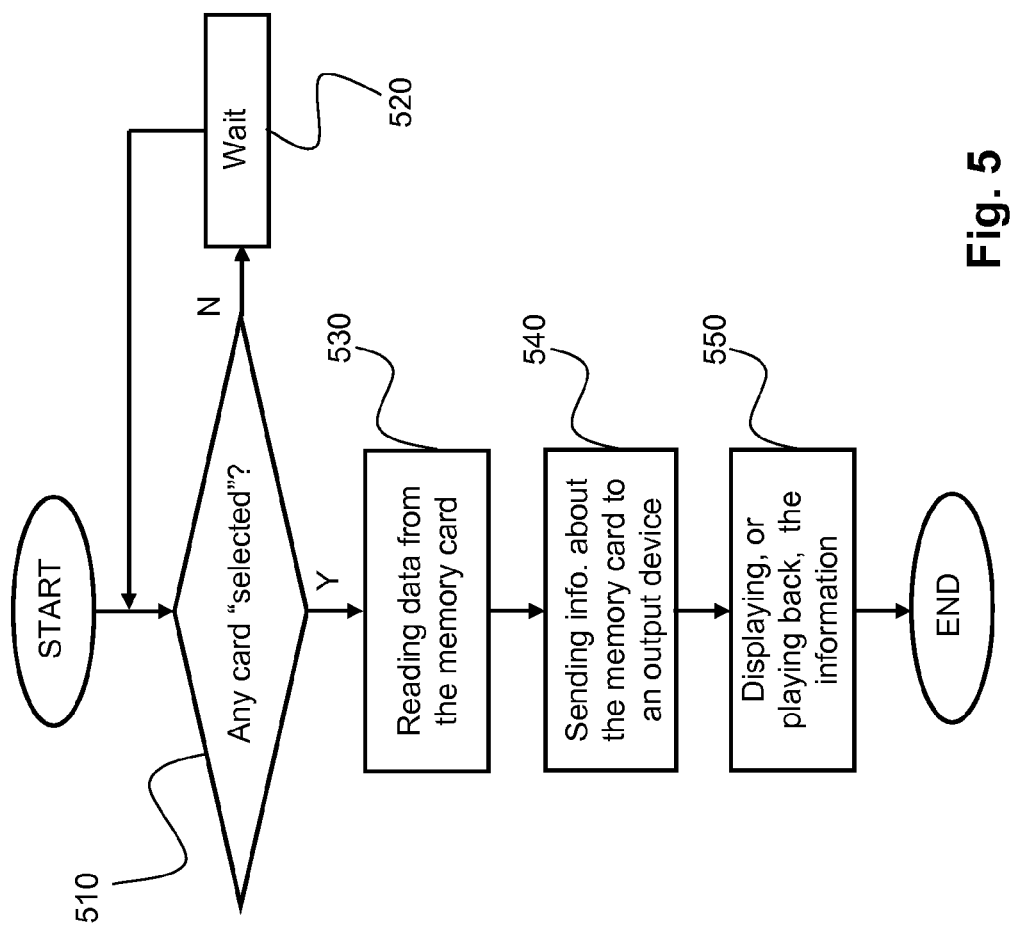
FIG. 5 illustrates a method usable by the portable device for managing memory cards according to an example embodiment.

FIG. 5 illustrates a method used by a portable device according to an example embodiment of the present disclosure. FIG. 5 will be described in association with FIG. 1. It is assumed that portable device 100 includes one or more memory cards that were previously inserted into sockets of portable device 100. At step 510 it is checked whether a memory card of the one or more inserted memory cards has been selected for data or information reading. A memory card may be selected for data reading by using a memory card detector, by using a ping mechanism, or by using a memory card selector (e.g., memory card selector 140). If no memory card selection has been made (shown as "N" at step 510), then, at step 520, controller 170 waits for such selection.

If an electrical socket includes a memory card detector, then upon inserting a memory card into such socket the memory card detector notifies controller 170 (e.g., by sending a corresponding signal to controller 170) of the inserted memory card, to which notification controller 170 responds by (i) reading data and/or information from the memory card (at step 530), (ii) sending the information to output device 185 (at step 540), and (iii) presenting information to the user of portable device 100 (at step 550) by transferring to output device 185 (i.e., to display 160, or to speaker 165, or to both) information about (i.e., information or signal pertaining or related to) the memory card in question.

If controller 170 uses a probing mechanism (e.g., a "ping" mechanism) to sense the presence of an inserted memory card, controller 170 "visits" each inserted memory card cyclically, and steps 530, 540 and 550 are repeated for each memory card that is visited by controller 170. If there are no memory card detectors and controller 170 does not use a ping mechanism, controller 170 has to wait, at step 520, until the user of portable device 100 uses memory card selector 140 to select a memory card for data/information reading. It is noted that a user may use memory card selector 140 to select a memory card for data/information reading regardless of whether the portable device 100 includes memory card detectors or controller 170 employs a ping tool, and use of memory card selector 140 may override (i.e., it may have priority over) use of such detectors and use of the ping tool.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules, and/or functionally equivalent modules. The present disclosure is relevant, mutatis mutandis, to various types of electrical sockets and to various memory cards such as SD-driven flash memory cards, flash storage device, non-flash storage devices, and so on.

What is claimed is:

1. A method of managing external memory cards, the method comprising:
   receiving, via an input device of a portable device, the input device at least partly disposed within a body of the portable device, a selection of one of n electrical sockets in the portable device where n is an integer greater than one, each of the n electrical sockets being configured to accommodate and to electrically engage a removable external memory card, wherein the input device is a single selector with n+1 physical positions, the single selector being one of a rotatable selector configured to be rotated by a user to one of the n+1 physical positions or a slidable selector including a slidable member configured to be slid by the user to one of the n+1 physical positions, and wherein one of the n+1 physical positions is useable to switch off the portable device and each of a remaining n physical positions of the n+1 physical positions is associated with a respective one of the n electrical sockets;
   responsive to the selected electrical socket being electrically engaged to a removable external memory card:
      reading data from the removable external memory card;
      transferring information related to or derived from the read data to a speaker of the portable device, the speaker at least partly disposed within the body of the portable device; and
      presenting the information via the speaker, wherein the data is transmittable via a communication interface of the portable device to external device; and
   responsive to the selected electrical socket not being electrically engaged to a removable external memory card, presenting an error message via the speaker.

2. The method of claim 1, wherein selection of a particular electrical socket is performed automatically by a memory card detector associated with the particular electrical socket.

3. The method of claim 1, wherein the input device is a user input device.

4. A portable device for managing a plurality of removable external memory cards, the portable device comprising:
   a body including n electrical sockets where n is an integer greater than one, wherein each electrical socket is configured to accommodate and to electrically engage a removable external memory card;
   a user input device including a single selector, the single selector having n+1 physical positions, the single selector being one of a rotatable selector configured to be rotated by a user to one of the n+1 physical positions or a slidable selector including a slidable member configured to be slid by the user to one of the n+1 physical positions, wherein one of the n+1 physical positions is adapted to cause the portable device to enter into a power-save mode and each of a remaining n physical positions of the n+1 physical positions is adapted to select a respective one of the n electrical sockets; and
   a controller adapted to receive an electrical socket selection from the user input device and, responsive to receiving the electrical socket selection, the controller further adapted to:
      responsive to an external memory card being electrically connected to the selected electrical socket, read data stored in an external memory card; and
      responsive to no external memory card being electronically connected to the selected socket, present an error message via a speaker, the speaker at least partial disposed within the body.

5. The portable device of claim 4, wherein the n electrical sockets are adapted to engage external memory cards that have different form factors.

6. The portable device of claim 4, further comprising n memory card detectors, wherein each of the n memory card detectors is incorporated into or associated with a respective electrical socket.

7. The portable device of claim 4, whereas data is read from or written into an external memory card electrically engaged with one of the unselected electrical sockets.

8. The portable device of claim 4, further comprising a communication interface adapted to transfer data to an external device.

9. The portable device of claim 8, wherein the communication interface is one of a Universal Serial Bus or a wireless interface, and the external device is one of a personal computer, a mobile telephone, a GPS device, an audio device, or a video game console device.

10. The portable device of claim 8, wherein the communication interface comprises a retractable communication interface configured to extend out of the body of the portable device and to retract into the body of the portable device, and further comprising a second user input device adapted to control retraction of the communication interface.

11. The portable device of claim 4, wherein the data read from an external memory card includes information pertaining to digital content of the external memory card, to an identity of the external memory card, or to a storage capacity of the external memory card.

12. The portable device of claim 4, wherein the selected socket is embedded in a slot.

13. The portable device of claim 4, wherein the n electrical sockets are adapted to accommodate and to electrically engage one or more of a MultiMedia Card, a Secure Digital (SD) memory card, a microSD card, a memory stick, a micro memory stick, and a CompactFlash card.

14. The portable device of claim 4, further comprising an output device adapted to receive information derived from or related to the data read from the electrically engaged external memory card, wherein the output device includes a display that displays the information derived from or related to the data read from the electrically engaged external memory card.

15. The portable device of claim 14, wherein the output device includes the speaker, wherein the data read from the electrically engaged external memory card includes an audio file, and wherein output of the audio file is directed to the speaker.

16. The portable device of claim 14, wherein the body is physically integrated with the output device.

17. The portable device of claim 4, further comprising a non-volatile memory, wherein the controller is further adapted to:
    initiate a scan cycle operation to detect electrical sockets from the n electrical sockets that are accommodating an electrically engaged removable external memory card; and
    store results of the scan cycle operation in the non-volatile memory, wherein the results identify each of the detected electrical sockets.

18. The portable device of claim 17, wherein the controller is further adapted to initiate the scan cycle operation periodically or in response to user input.

19. A device to manage data storage devices, the device comprising:
    a body including n electrical sockets where n is an integer greater than one, each of the n electrical sockets configured to electrically engage a removable data storage device;
    a user input device including a single selector, the single selector having n+1 physical positions, the single selector being one of a rotatable selector configured to be rotated by a user to one of the n+1 physical positions or a slidable selector including a slidable member configured to be slid by the user to one of the n+1 physical positions, wherein one of the n+1 physical positions is adapted to cause the device to enter into a power-save mode and each of a remaining n physical positions of the n+1 physical positions is adapted to select a respective one of the n electrical sockets;
    a speaker output device at least partly disposed within the body; and
    a controller configured to:
        receive from the user input device a selection of one of the n electrical sockets;
        in response to receiving the selection of a selected electrical socket that is electrically engaged to a removable data storage device, read data stored at the removable data storage device and transfer information associated with the data to the speaker output device; and
        in response to receiving the selection of a selected electric socket that is not electrically engaged to a removable data storage device, present an error message via the speaker output device.

* * * * *